United States Patent
Paiss

(10) Patent No.: US 8,831,681 B1
(45) Date of Patent: Sep. 9, 2014

(54) IMAGE GUIDED AUDIO PROCESSING

(75) Inventor: Omry Paiss, Ramat-Gan (IL)

(73) Assignee: Marvell International Ltd., Hamilton (BM)

( * ) Notice: Subject to any disclaimer, the term of this patent is extended or adjusted under 35 U.S.C. 154(b) by 528 days.

(21) Appl. No.: 12/958,932

(22) Filed: Dec. 2, 2010

Related U.S. Application Data

(60) Provisional application No. 61/292,129, filed on Jan. 4, 2010.

(51) Int. Cl.
  *H04M 1/00* (2006.01)

(52) U.S. Cl.
  USPC ............ 455/556.1; 455/575.1; 348/36

(58) Field of Classification Search
  USPC ............................................. 455/556.1
  See application file for complete search history.

(56) References Cited

U.S. PATENT DOCUMENTS

| | | | | |
|---|---|---|---|---|
| 5,313,522 A * | 5/1994 | Slager | | 704/276 |
| 5,686,957 A * | 11/1997 | Baker | | 348/36 |
| 6,097,381 A * | 8/2000 | Scott et al. | | 715/203 |
| 6,185,152 B1 * | 2/2001 | Shen | | 367/118 |
| 6,816,836 B2 * | 11/2004 | Basu et al. | | 704/270 |
| 7,957,766 B2 * | 6/2011 | Gong et al. | | 455/556.1 |
| 2008/0019548 A1 | 1/2008 | Avendano | | |
| 2010/0225461 A1 * | 9/2010 | Tuli | | 340/436 |
| 2011/0103624 A1 * | 5/2011 | Ferren | | 381/306 |

OTHER PUBLICATIONS

"Eigenface Tutorial," Website:http://www.pages.drexel.edu/~sis26/Eigenface%20Tutorial.htm, (Date Unknown).
"Face Recognition," National Science and Technology Council Committee on Technology, Aug. 7, 2006.
"Algorithms," Website: http://en.wikipedia.org/wiki/Speech_recognition, (Date Unknown).
Goldin, "Autodirective Dual Microphone," Audio Engineering Society Convention Paper, $114^{th}$ Convention, Mar. 22-25, 2003, Amsterdam, The Netherlands.
Faneuff, "Spatial, Spectral, and Perceptual Nonlinear Noise Reduction for Hands-free Microphones in a Car," Worcester Polytechnic Institute, Jul. 2002.
Fortemedia Inc.—Technology, Viewed: Oct. 7, 2010.
Colton, "Automatic Speech Recognition Tutorial," Jun. 17, 2003.
Thrass Co., Instructions, Website: http://www.thrass.co.uk/PM6/instructions.htm, 2009.

* cited by examiner

*Primary Examiner* — Ajibola Akinyemi

(57) ABSTRACT

An image guided audio communication device is disclosed that includes a camera mounted on a front-side that captures an image. Directional information from the image is used to control priorities given to audio signals coming toward a front-side of the communication device during audio processing.

19 Claims, 8 Drawing Sheets

IMAGE GUIDED AUDIO PROCESSING

INCORPORATION BY REFERENCE

This application claims the benefit of U.S. Provisional Application No, 61/292,129, "DIRECTIONAL MICROPHONE FOR HANDHELD SPEAKERPHONE" filed on Jan. 4, 2010, including all cited references which are incorporated herein by reference in their entirety.

BACKGROUND

Mobile communication devices such as cell phones are ubiquitous. These devices often have speakerphone modes so that a user does not have to hold a device against the ear. Also, speakerphone mode allows for multiple users to participate in a conversation.

SUMMARY

An image guided audio communication device such as a cell phone is disclosed. The communication device includes an imaging device such as a camera mounted on a front-side configured to provide an image. The camera captures the image that contains directional information. An audio processor coupled to the imaging device and to an audio input device is configured to process audio information received from the audio input device such as microphones based on the directional information obtained from the image.

An image direction processor coupled to the camera and the audio processor is configured to search for a face in the image, and to generate the directional information based on results of the search. If a face is found, the image direction processor generates a front signal. If a face is not found, the image direction processor generates a not-front signal. The audio processor gives a higher priority to audio signals coming toward a front-side direction if the front signal is generated and reduces a priority for these audio signals if the not-front signal is generated. If the image is determined not to contain useful information due to insufficient light energy, for example, then a no-image signal is generated, and the audio processor processes the audio information based on only the audio information.

In one embodiment, the image direction processor detects whether speech is in the audio information. If speech is detected, the image direction processor determines whether the detected speech correlates with lip movements of a face in the image. If a correlation is found, the front signal is generated, but if not found, the not-front signal is generated. In a further embodiment, the image direction processor determines an amount of correlation between the lip movements of the face and the detected speech and generates a parameter indicating the amount of correlation. The audio processor processes the audio information giving priority to audio signals from different spatial directions based on the parameter.

In yet another embodiment, the image direction processor performs speech recognition to extract a sequence of phonemes from the audio information. The image direction processor determines whether lip shapes of a face in the image correlates with the sequence of phonemes and outputs the front signal and the parameter if sufficient correlation is found.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
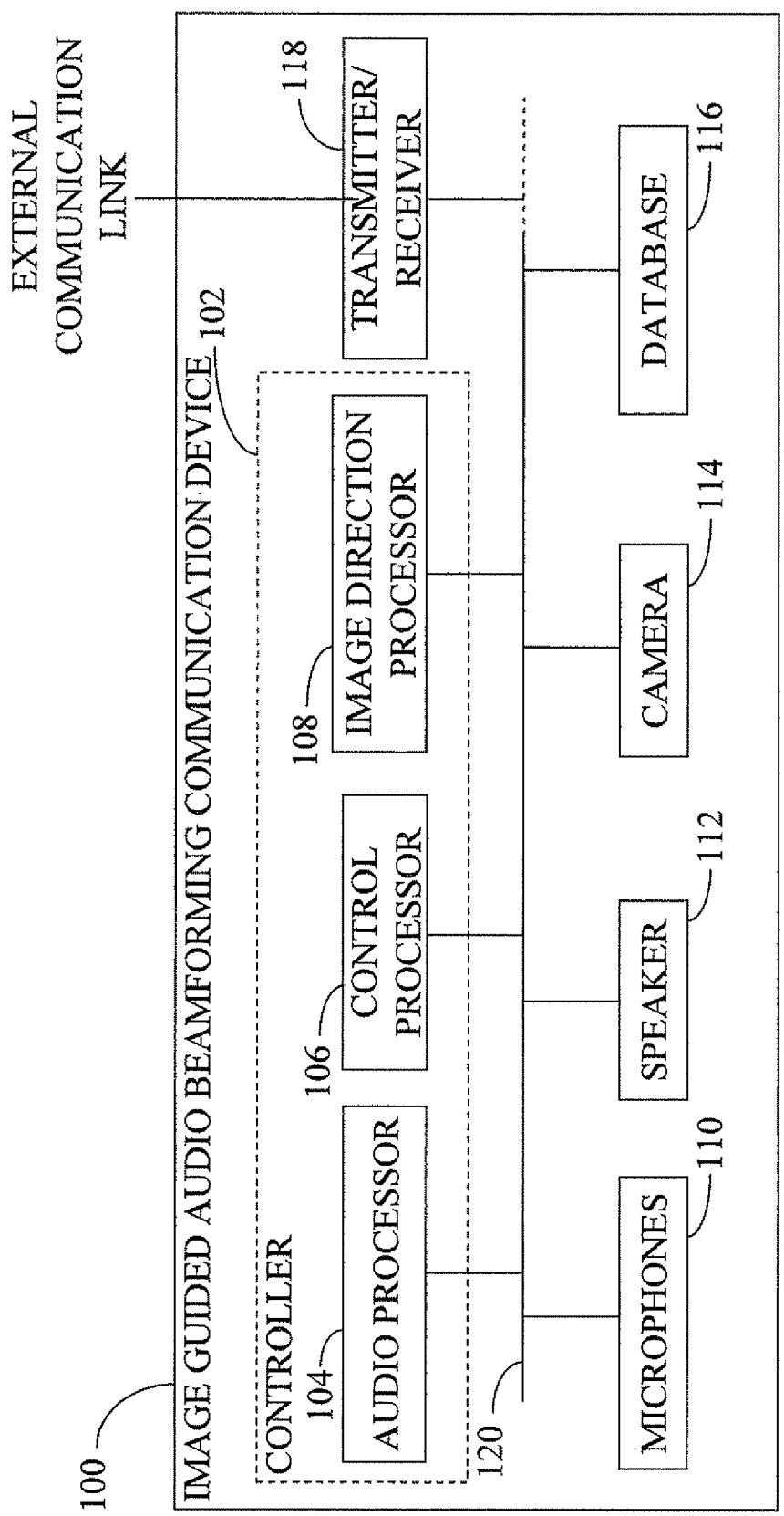
FIG. 1 illustrates a block diagram of an image guided audio communication device.

FIG. 1 shows an image guided audio communication device (communication device) 100 that includes a controller 102, microphones 110, a speaker 112, a camera 114, a database 116, and a transmitter/receiver 118. Components 102-118 are coupled together by signal bus 120. Controller 102 includes an audio processor 104, a control processor 106 and an image direction processor 108. Functions performed by processors 104-108 may be performed by a single CPU such as a microprocessor or by multiple processors in the form of application specific integrated circuits (ASICs) as circumstances dictate. Database 116 may be a centralized memory accessible from signal bus 120 or a memory that is distributed among components 102-118 as specific design requirements dictate.

A cell phone is discussed below as an example of the communication device 100 for convenience of illustration. Thus, the cell phone is referred to as cell phone 100, below. However, communication device 100 encompasses any communication device that includes microphones, a camera and a speaker that implements the disclosed functions. Also, an audio signal is received from each of microphones 110. For digital processing, the audio signals are sampled into digital data for processing. For analog processing the audio signals are processed directly. In either case, the term "audio signal" will be used below to refer to audio information received by microphones 110 or output through transmitter/receiver 118.

When used in speakerphone mode in a call, cell phone 100 is generally held facing the user. Control processor 106 activates camera 114 as an imaging device to capture image data of an image. The image data is stored in database 116, and image direction processor 108 processes the image data to find a face in the image. If a face associated with the call is found, image direction processor 108 sends a front signal to audio processor 104 to indicate that a sound source in the call is facing a front-side of cell phone 100. If the front signal is received, audio processor 104 processes the audio information giving higher priority to audio signals coming toward the front-side of cell phone 100. If a face associated with the call is not found, then a not-front signal is sent, and audio processor 104 processes the audio information giving reduced priority to audio signals coming toward the front-side of cell phone 100. If the image data does not contain useful direction information, a no-image signal is sent and audio processor 104 performs audio processing based only on the audio information from microphones 110 for the call.

Figure 2:
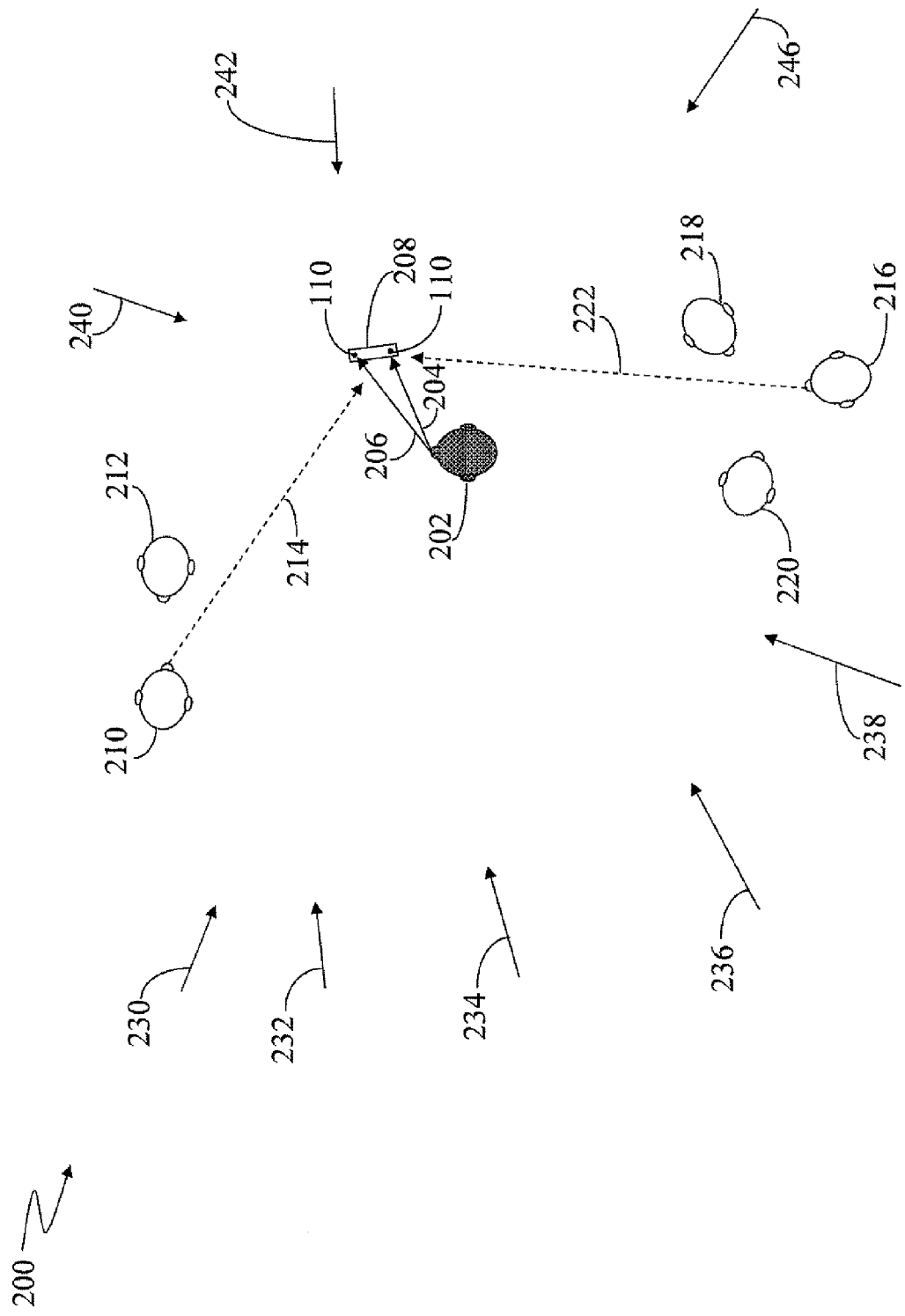
FIG. 2 illustrates an environment where the communication device of FIG. 1 is used.

FIG. 2 shows an example of an environment 200 in which cell phone 100 is used. User 202 is operating in speakerphone mode. Cell phone 100 has two microphones 110 represented by black dots. Microphones 110 receive audio signals represented by arrows 204 and 206 from user 202. However, other people 210, 212, 216, 218 and 220 are also in the same area as user 202 and their voices reach microphones 110 as represented by dotted arrows 214 and 222. Additionally other environmental noise sources that generate diffused noises such as printers, coffee machines, public announcements, traffic noise, etc. are represented by arrows 230-246.

Figure 3:
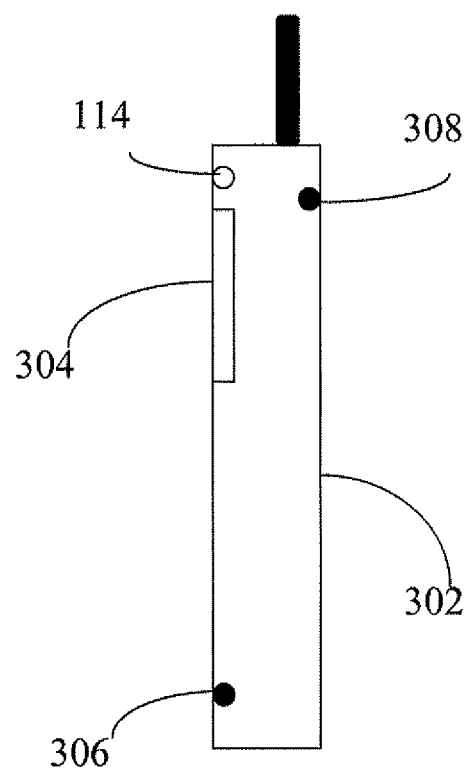
FIG. 3 illustrates an example cell phone.

FIG. 3 shows an example of a cell phone 302 that includes camera 114, a display 304, a primary microphone 306 located on a front-side of cell phone 302, and a secondary microphone 308 located on a back-side of cell phone 302. Audio signals received from primary and secondary microphones 306 and 308 are processed according to an acoustic reception pattern that is controlled to give priority to audio signals received from a direction coming toward the front-side of cell phone 302 or toward the back-side of cell phone 302, and/or to cancel out noise signals from directions next to the front- or back-sides.

Various audio processing to perform the above functions are known. For example, U.S. Patent Publication No. 2008/0019548 (548 publication); and Alexander Goldin of Alango Ltd., Haifa, 34751, Israel, "Autodirective Dual Microphone," Audio Engineering Society, 114$^{th}$ Convention, 2003 March 22-25 Amsterdam, The Netherlands, disclose forming an acoustic reception pattern that points in a direction toward the front of a cell phone. Thus, acoustic signals coming from a source facing the front of the cell phone has higher reception than acoustic signals coming from a source facing the back of the cell phone. Also, for closely spaced microphones, Fortemedia at 19050 Pruneridge Avenue Suite 100, Cupertino, Calif. 95014, discloses forming a conic beam by using a small array microphone (SAM) beam-forming technique.

Additionally, time delay beam forming and general sidelobe canceller (GSC) are disclosed in "Spatial, Spectral, and Perceptual Nonlinear Noise Reduction for Hands-free Microphones in a Car," Jeffery Faneuff, Thesis submitted to faculty of Worchester Polytechnic Institute for the degree of Master of Science in Electrical and Computer Engineering, July 2002 ("Faneuff"). Faneuff at FIG. 4.6, an audio beam is formed by time delay summing toward a source of audio signals and nulls are steered by GSC to cancel noise.

The above audio processing techniques (herein referred to as "normal" processing) all rely on determining a direction of a source of audio signals. When only inputting audio signals from microphones such as microphones 110, the direction of the source is many times determined by using algorithms based on probabilistic models. However, this procedure sometimes leads to erroneous location of the source. For example, when operating in an environment such as shown in FIG. 2, the above techniques sometimes fail to locate the source, resulting in audio signals from the source being attenuated and amplifying audio signals from undesirable noise sources. Thus, communication device 100 enhances these techniques by providing an input from camera 114, and a more robust algorithm for processing the audio signals is produced.

Figure 4:
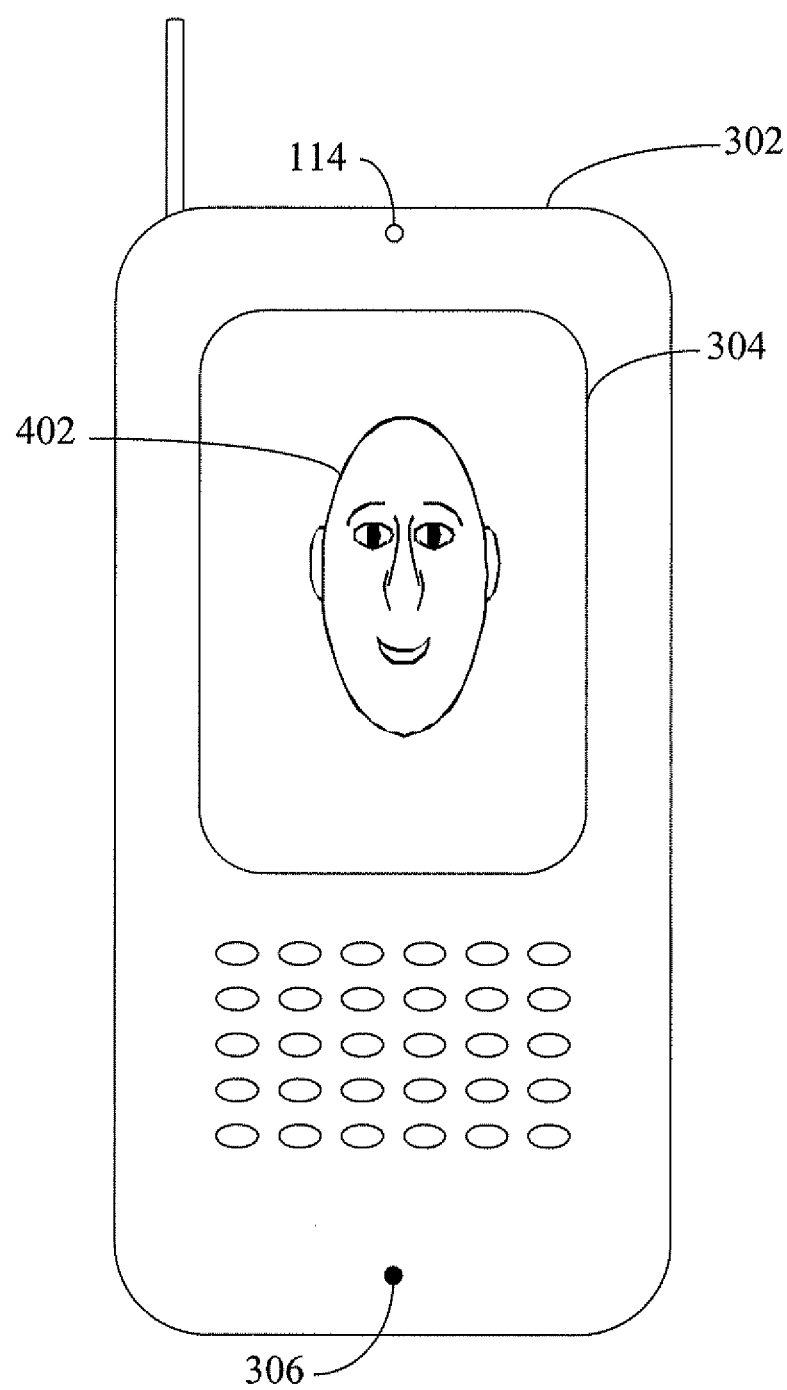
FIG. 4 illustrates an image captured by a camera of the cell phone.

FIG. 4 shows a front view of cell phone 302 having face 402 in display 304 as captured by camera 114. If face 402 is identified to be a source of audio signals for the call, then the front signal is sent to audio processor 104 to positively indicate that the source of input audio signals is in front of cell phone 302. If the front signal is received, audio processor 104 sets the audio processing parameters to give higher priority to audio signals coming in a direction facing the front-side of cell phone 302. However, if either face 402 is identified not to be the source or if a face is not in an image of camera 114, then the not-front signal is sent to audio processor 104 to positively indicate that the source is not in front facing cell phone 302.

In this case, audio processor 104 sets the audio processing parameters to reduce a priority of audio signals coming in the direction facing cell phone 302. If camera 114 does not produce a useful image because camera 114 is covered (e.g., next to a speaker's ear), then the no-image signal is sent to audio processor 104. In this case, audio processor 104 proceeds to process the audio signals based on the normal audio processing without using any information from camera 114. For example, audio processor 104 sets priorities for audio signals from various directions based on the audio signals alone.

Figure 5:
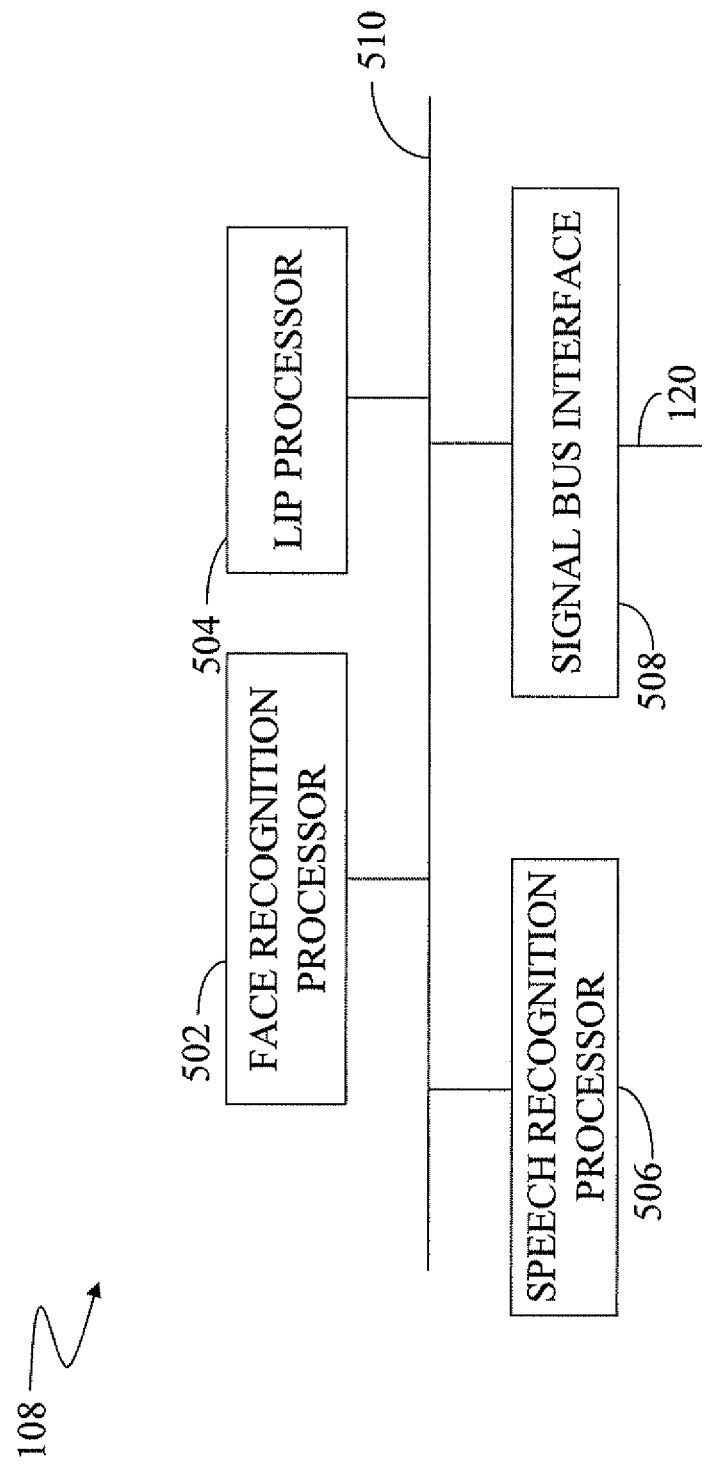
FIG. 5 illustrates a block diagram of an image direction processor.

FIG. 5 shows a block diagram of image direction processor 108 that includes a face recognition processor 502, a lip processor 504, a speech recognition processor 506, a signal bus 510, and a signal bus interface 508 that provides an interface between signal buses 120 and 510. Face recognition processor 502 accesses image data captured by camera 114 from database 116 and processes the image data by known methods to determine if a face is present. See, e.g., Harmon, L. D., "The recognition of faces," Scientific American (1973 November) 229(5):71-82.

As noted above, face recognition processor 502 generates 3 types of signals: front signal, not-front signal and no-image signal. The no-image signal is determined by total light energy received by camera 114, for example. If camera 114 is covered by a speaker's hair or blocked by an opaque object, then camera 114 does not capture useful information regarding a direction of the speaker and the image data is ignored for the purpose of audio signal processing.

If camera 114 captures a usable image, and one face is found, then in one embodiment, face recognition processor 502 assumes that the face is that of the speaker and sends the front signal to audio processor 104 to give higher priority to audio signals coming in the direction of the front-side of cell phone 302. In another embodiment, face recognition processor 502 does not assume that a face found in the image data is the speaker, but further confirms whether the face is the speaker by correlating the image of the face with received audio signals.

Audio signals received from microphones 306 and 308 are processed by speech recognition processor 506 to determine if speech is present using known methods. See, e.g., L. R. Rabiner and B. H. Juang, "Introduction to Hidden Markov Models", IEEE ASSP Magazine, January 1986; and Lawrence Rabiner and Biing-Hwang Juang, "Fundamentals of Speech Recognition", Orentice Hall, 1993. This speech detection does not necessarily require speech recognition, but only whether speech is being uttered by the speaker. If speech is present, then speech recognition processor 506 sends a speech-present signal to face recognition processor 502 that in turn determines whether the face in the image data has moving lips that correlate in time with the detected speech. If the lips of the face correlate in time with the detected speech, then the face in the image data is assumed to be the speaker and the front signal is sent to audio processor 104. However, if the face does not have moving lips that correlate in time with the detected speech, then the face is not that of the speaker, and the not-front signal is sent to audio processor 104.

In a further embodiment, if multiple faces are found in the image, face recognition processor 502 determines if any of the faces have lip movements that correlate in time with the detected speech. If none of the lips has movements that correlate in time with the detected speech, then a not-front signal is sent to audio processor 104. However, many times when several persons are together in a call using a single speaker phone, there is a main speaker and others occasionally join in. In this case, face recognition processor 502 determines a percentage of time the faces in the image captured by camera 114 have lip movements that correlate in time with the detected speech. If the correlation between all the lip movements in the image data and the detected speech exceed a threshold amount of time, face recognition processor 502 sends a front signal that includes a parameter indicating an amount of correlation. For example, the parameter is a single bit where a 0 indicates below the threshold and a 1 indicates above the threshold. If the audio processing in audio processor 104 can benefit from greater granularity, then more threshold levels and a larger number of parameter bits are used.

In yet a further embodiment, face recognition processor 502 confirms that a detected face is the speaker by comparing lip shapes with a sequence of phonemes obtained by speech recognition processor 506 from detected speech. Face recognition processor 502 extracts lip portions of detected faces and sends them to lip processor 504 to determine which of the faces has lip shapes that correspond to the sequence of phonemes during time periods as determined by speech recognition processor 506. For example, speech recognition processor 506 time-stamps speech audio signals. Face recognition processor 502 also time-stamps the lip portions sent to lip processor 504. Lip processor 504 compares lip shapes obtained from database 116 that correspond to the sequence of phonemes with the lip shapes for substantially same timestamps.

Figure 6:
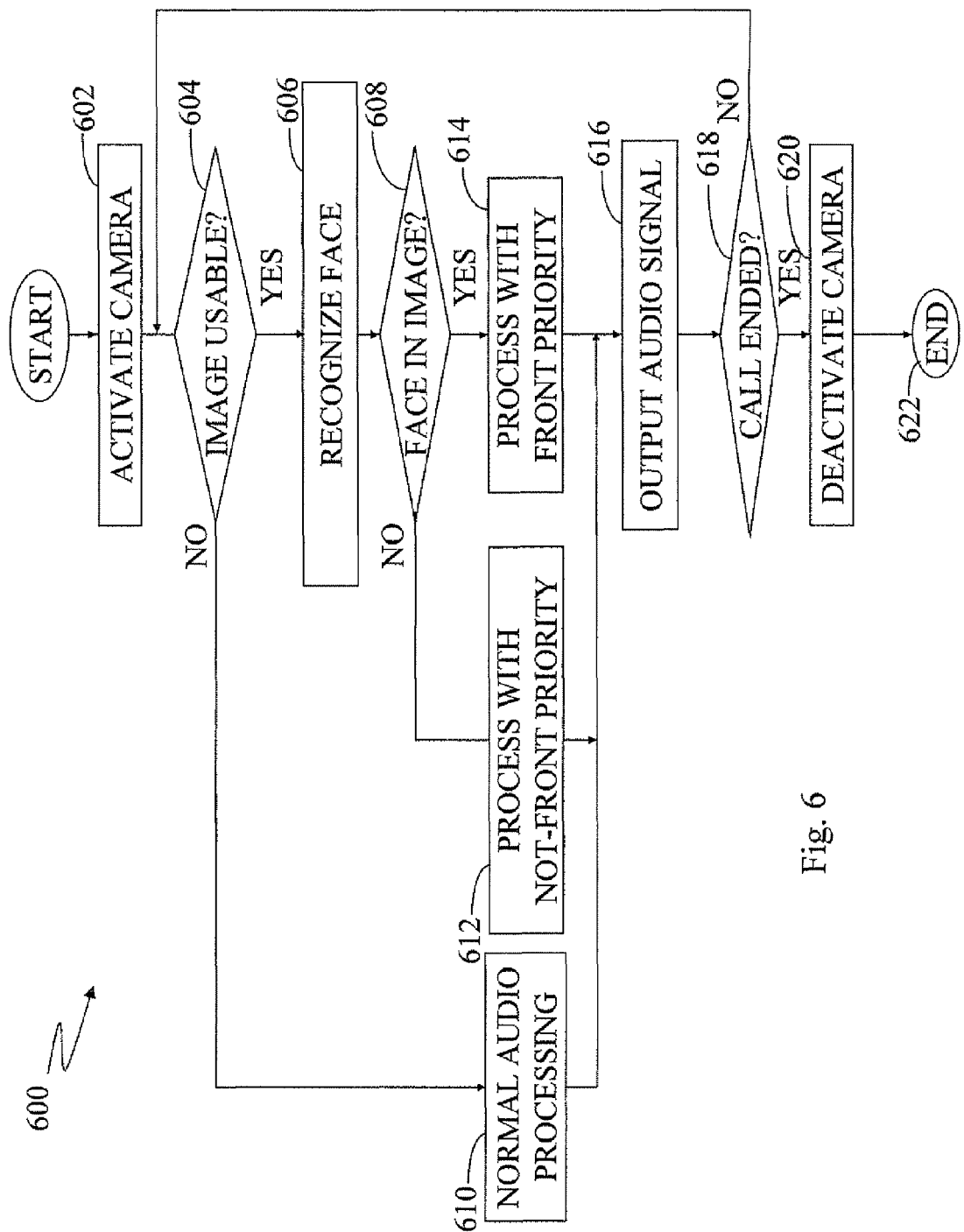
FIG. 6 illustrates a flowchart of an image guided audio processing.

FIG. 6 shows a flowchart 600 of a process of communication device 100 for a call. In step 602, the process activates camera 114 to capture image data, and goes to step 604. Captured image data is stored in database 116 for retrieval by image direction processor 108 for processing. In step 604, the process determines whether the captured image is usable. For example, if the image is too dark or too light for face searching purposes, then the captured image is not usable. If the captured image is usable, the process goes to step 606. Otherwise, if the captured image is not usable, the process goes to step 610. In step 606, the process searches for a face, and goes to step 608. In step 608, if a face is found, the process goes to step 614. Otherwise, if no face is found, the process goes to step 612.

In step 610, the process performs normal audio signal processing without any information from camera 114, and goes to step 616. In step 612, the process performs audio processing reducing priority of audio signals coming in the direction facing the front-side of cell phone 302, and goes to step 616. In step 614, the process performs audio processing giving a higher priority to audio signals coming in the direction facing the front-side of cell phone 302, and goes to step 616. In step 616, the process outputs an audio signal resulting from the audio processing from one of the steps 610, 612 or 614, and goes to step 618. The audio signal is output to transmitter/receiver 118 as the audio signal for the call. In step 618, the process determines if the call has ended. If the call ended, the process goes to step 620. Otherwise, if the call has not ended, the process returns to step 604. In step 620, the process deactivates camera 114, and goes to step 622 and ends.

Figure 7:
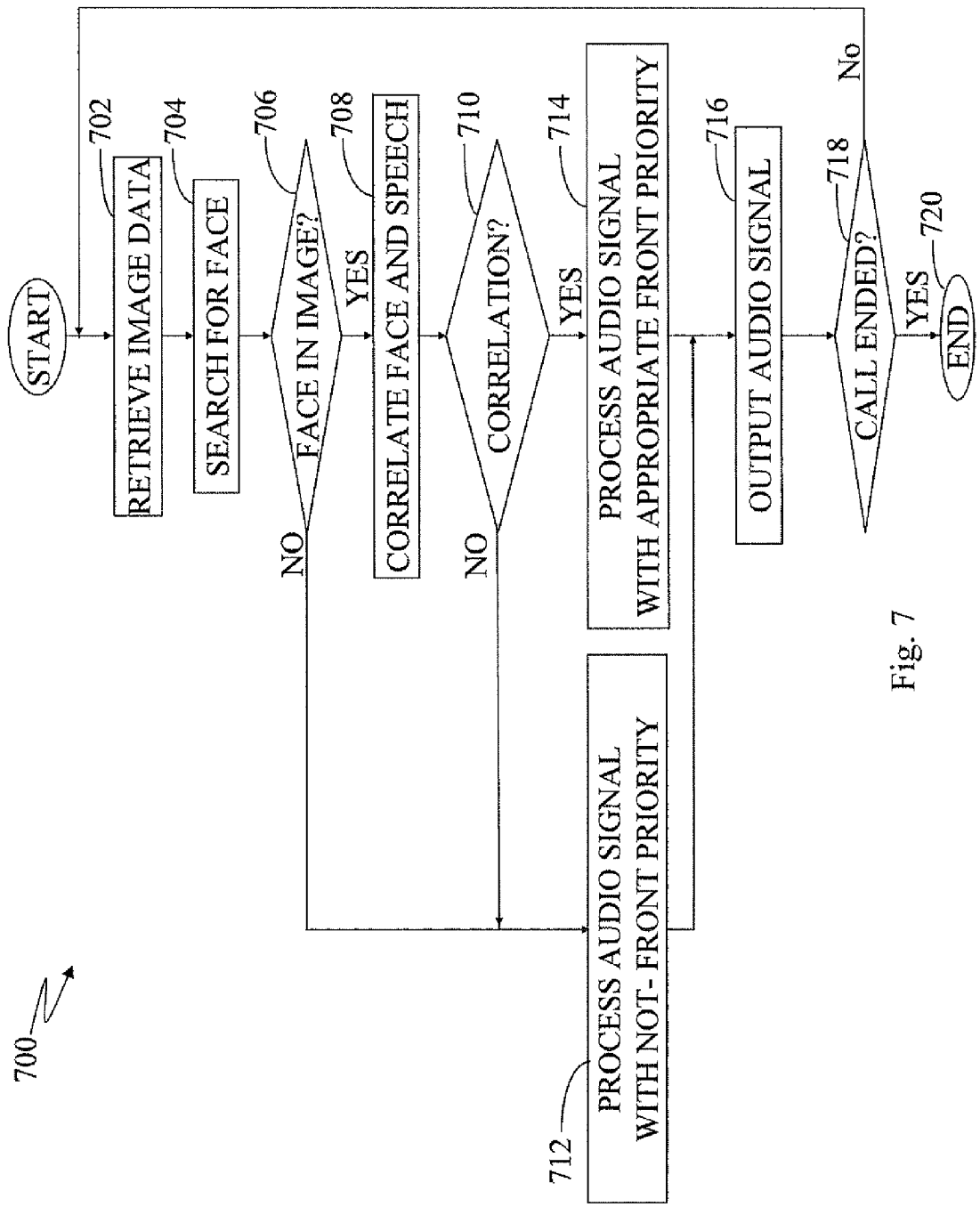
FIG. 7 illustrates a flowchart of image face processing.

FIG. 7 shows a flowchart 700 for searching for a face process. In step 702, the process retrieves image data of a captured image from database 116 and goes to step 704. In step 704, the process searches for a face in the image data, and goes to step 706. In step 706, the process determines whether a face is found in the image data. If a face is found, the process goes to step 708. Otherwise, if a face is not found, the process goes to step 712. In step 708, the process performs speech processing and determines whether there is a correlation between the results of the speech processing and lips of the face, and goes to step 710. In one embodiment, the process correlates the time when speech is detected and lip movements of the face. In another embodiment, the process correlates lip shapes with phonemes of recognized speech.

In step 710, the process determines whether a correlation is found. If a correlation is found, the process goes to step 714. Otherwise, if a correlation is not found, the process goes to step 712. In step 712, the process performs audio processing reducing priority of audio signals coming in the direction facing the front-side of cell phone 302, and goes to step 716. In step 714, the process performs audio processing giving higher priority to audio signal coming in the direction facing the front-side of cell phone 302, and goes to step 716. As noted above, in one embodiment, a parameter is sent to audio processor 104 that indicates a number of threshold levels that the correlation has exceeded so that audio processing priorities is set for an audio spatial pattern that is appropriate for the level of correlation between the detected speech and lip movements of a detected face.

In step 716, the process outputs the audio signal generated by the audio processing of audio processor 104, and goes to step 718. The audio signal is output to transmitter/receiver 118 as the audio signal for the call. In step 718, the process determines whether the call has ended. If the call ended, the process goes to step 720 and ends. Otherwise, the process returns to step 702.

Figure 8:
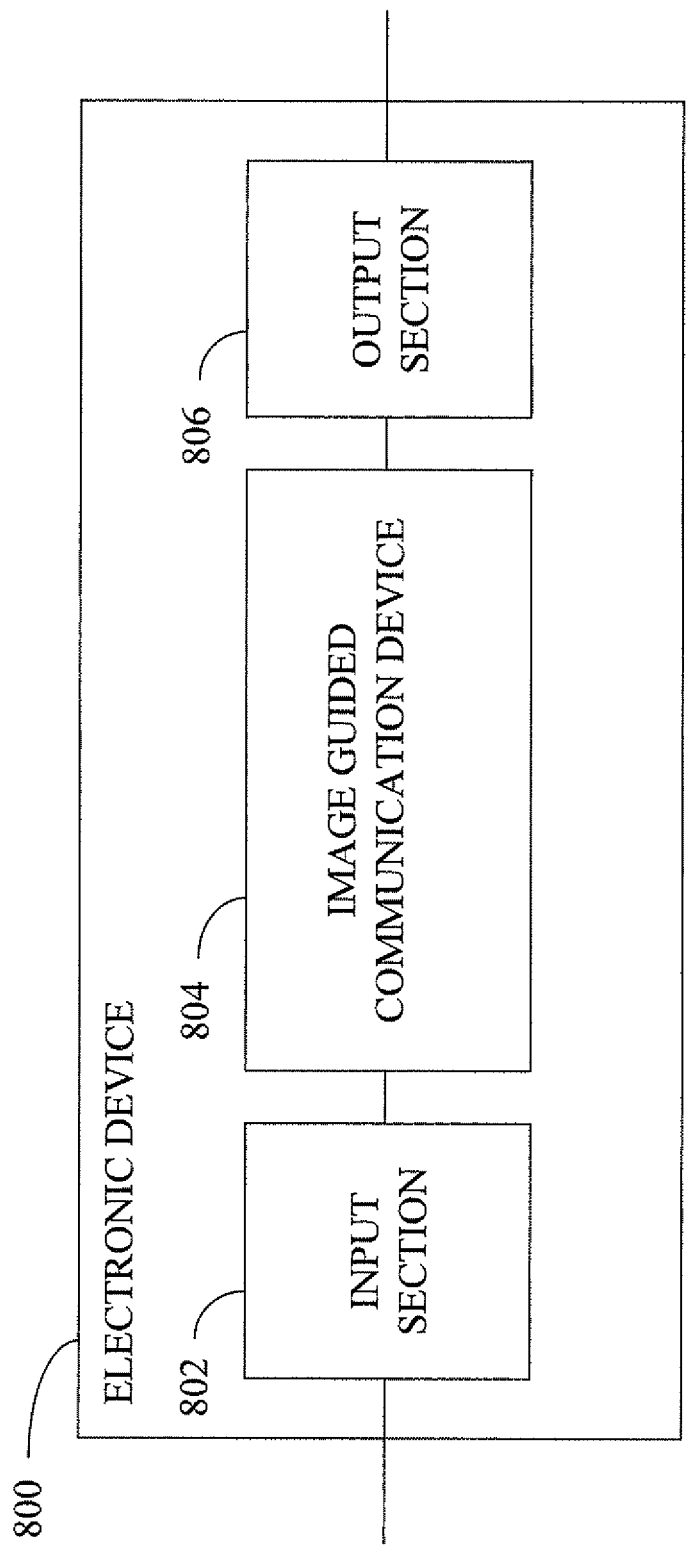
FIG. 8 illustrates an electronic device that includes the communication device of FIG. 1.

FIG. 8 shows a suitable electronic device 800 such as a laptop computer, a personal digital assistant (PDA), a cell phone, a landline phone, a console computer, etc. For example, a cell phone is such an electronic device when it includes:
1. a keyboard as an input section 802;
2. a camera, multiple microphones, a processor that performs face recognition and speech recognition to determine whether or not and how much a source of audio input is from the front-side of the cell phone, and a transmitter, as an image guided communication device 804; and
3. a display as an output section 806.

While the invention has been described in conjunction with specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A communication device comprising:
   an imaging device including a camera that is configured to provide an image;
   an image direction processor coupled to the imagine device, the image processor configured to search for a face in the image and generate, based on the search, directional information:
   an audio input device configured to receive audio information; and
   an audio processor coupled to the imaging device and the audio input device, the audio processor configured to process the audio information to give priority to audio signals received from a direction based on the directional information obtained from the image direction processor.

2. The communication device of claim 1, wherein the directional information comprises:

a front signal indicating that audio signals coming toward a front-side of the communication device receives a higher priority;

a not-front signal indicating that audio signals coming toward the front-side of the communication device receives a reduced priority; and a no-image signal indicating that priorities for audio signals are set based on the audio information alone.

3. The communication device of claim 1, wherein the camera is mounted on a front-side of the communication device and is configured to capture an image facing the front-side;

the audio input device comprises a plurality of microphones that receives audio signals and output the audio information;

the image direction processor is configured to generate a front signal as the directional information if the face is found in the image; and the audio processor is configured to process the audio information and giving higher priority to audio signals coming toward the front-side of the communication device if the front signal is received from the image direction processor, and outputs a processed audio signal to a transmitter of the communication device.

4. The communication device of claim 1, wherein the camera is mounted on a front-side of the communication device and is configured to capture an image facing the front-side;

the audio input device comprises a plurality of microphones that receive audio signals and output the audio information;

the image direction processor is configured to generate a not-front signal as the directional information if the face is not found in the image; and the audio processor is configured to process the audio information and giving reduced priority to audio signals coming toward the front-side of the communication device if the not-front signal is received from the image direction processor, and outputs a processed audio signal to a transmitter of the communication device.

5. The communication device of claim 1 wherein the camera is mounted on a front-side of the communication device and is configured to capture an image facing the front-side, the image direction processor is configured to detect whether speech is in the audio information and generate a front signal as the directional information if the face is found to have lip movements that correlate with detected speech; and the audio processor is configured to process the audio signals from selected microphones of the audio input devices to give higher priority to audio signals coming toward the front-side of the communication device and output a processed audio signal to a transmitter of the communication device.

6. The communication device of claim 1, wherein the camera is mounted on a front-side of the communication device and is configured to capture an image facing the front-side, the image direction processor is configured to detect whether speech is in the audio information and generate a not-front signal as the directional information if the face is found not to have lip movements that correlate with detected speech; and the audio processor is configured to process the audio signals from selected microphones of the audio input device to give reduced priority to audio signals coming toward the front-side of the communication device if the not-front signal is received and outputs a processed audio signal to a transmitter of the communication device.

7. The communication device of claim 1 wherein the image direction processor is configured to generate a sequence of phonemes based on the audio information and generate a front signal as the directional information if the face having lip shapes that correlate with the sequence of phonemes is found; and the audio processor is configured to process the audio signals from microphones of the audio input device to give higher priority to audio signals coming toward a front-side of the communication device and outputs a processed audio signal to a transmitter of the communication device.

8. The communication device of claim 1 wherein the image direction processor is configured to generate a sequence of phonemes based on the audio information and generate a not-front signal as the directional information if the face having lip shapes that correlate with the sequence of phonemes is not found; and the audio processor is configured to process the audio signals from microphones of the audio input device to give reduced priority to audio signals coming toward a front-side of the communication device and output a processed audio signal to a transmitter of the communication device.

9. The communication device of claim 1 wherein the camera is mounted on a front-side of the communication device and capturing an image facing the front-side, the image direction processor is configured to detect whether speech is in the audio information and generate a front signal and a parameter as the directional information if the face is found to have lip movements that correlate with a portion of detected speech; and the audio processor is configured to process the audio signals from microphones of the audio input device giving a priority to audio signals coming toward the front-side of the communication device based on the front signal and the parameter and outputs a processed audio signal to a transmitter of the communication device.

10. The communication device of claim 9 wherein the parameter indicates an amount of correlation between the lip movements and the detected speech.

11. An electronic device comprising:

an input section;

an output section; and the communication device of claim 1, wherein the input section includes the audio input device.

12. A method for processing audio information comprising:

forming an image;

searching for a face in the image;

generating directional information based on results of the searching;

receiving the audio information;

processing the audio information based on the directional information of the image to output an audio signal; and giving priority to audio signals received from a direction based on the directional information.

13. The method of claim 12 further comprising:
generating a front signal if the face is found in the image, wherein
the processing the audio information gives a higher priority to audio signals coming toward a front-side direction if the front signal is generated.

14. The method of claim 12 further comprising:
generating a not-front signal if the face is not found in the image, wherein
the processing the audio information reduces a priority of audio signals coming toward a front-side direction if the not-front signal is generated.

15. The method of claim 12 further comprising:
detecting a speech in the audio information; and
generating a front signal if the face having lip movements that correlate with the speech is found in the image, wherein
the processing the audio information gives a higher priority to audio signals coming toward a front-side direction if the front signal is generated.

16. The method of claim 12 further comprising:
detecting a speech in the audio information; and
generating a not-front signal if the face having lip movements that correlate with the speech is not found in the image, wherein
the processing the audio information reduces a priority of audio signals coming toward a front-side direction if the not-front signal is generated.

17. The method of claim 12 further comprising:
generating a sequence of phonemes based on the audio information; and
generating a front signal if the face having lip shapes that correlate with the sequence of phonemes is found in the image, wherein
the processing the audio information gives a higher priority to audio signals coming toward a front-side direction if the front signal is generated.

18. The method of claim 12 further comprising:
generating a sequence of phonemes based on the audio information; and
generating a not-front signal if the face having lip shapes that correlate with the sequence of phonemes is not found in the image, wherein
the processing the audio information reduces a priority of audio signals coming toward a front-side direction if the not-front signal is generated.

19. The method of claim 12 further comprising:
detecting a speech in the audio information; and
generating a front signal and a parameter if the face having lip movements that correlate with a portion of the speech is found in the image, wherein
the processing the audio information giving a priority to audio signals coming toward a front-side direction based on the front signal and the parameter.

* * * * *